(12) United States Patent
Rosenzweig et al.

(10) Patent No.: US 10,225,309 B1
(45) Date of Patent: Mar. 5, 2019

(54) MONITORING OF MEDIA PIPELINE HEALTH USING TRACING

(71) Applicant: Amazon Technologies, Inc., Seattle, WA (US)

(72) Inventors: Jesse Jerome Rosenzweig, Portland, OR (US); Gregory Kenneth Truax, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 197 days.

(21) Appl. No.: 15/077,647

(22) Filed: Mar. 22, 2016

(51) Int. Cl.
*G06F 15/16* (2006.01)
*H04L 29/06* (2006.01)

(52) U.S. Cl.
CPC ........ *H04L 65/605* (2013.01); *H04L 65/4069* (2013.01); *H04L 65/80* (2013.01)

(58) Field of Classification Search
CPC .................................................... H04L 47/625
USPC ......................................................... 709/219
See application file for complete search history.

(56) References Cited

U.S. PATENT DOCUMENTS

| | | | |
|---|---|---|---|
| 7,191,387 B1 | 3/2007 | Massoudi | |
| 7,337,231 B1 | 2/2008 | Li | |
| 7,925,738 B2 | 4/2011 | Tang et al. | |
| 8,792,347 B2 | 7/2014 | Swenson et al. | |
| 9,066,133 B2 | 6/2015 | Sharif-Ahmadi et al. | |
| 9,154,361 B2 | 10/2015 | Swenson et al. | |
| 2007/0250901 A1* | 10/2007 | McIntire | H04N 7/17318 725/146 |
| 2012/0281546 A1* | 11/2012 | Li | H04B 17/18 370/242 |
| 2013/0100830 A1* | 4/2013 | Brady | H04L 43/10 370/252 |
| 2013/0232419 A1* | 9/2013 | Yates | G06F 3/0484 715/723 |
| 2014/0026002 A1* | 1/2014 | Haines | G06F 11/0766 714/57 |
| 2014/0089934 A1* | 3/2014 | Dube | G06F 9/50 718/104 |
| 2016/0092286 A1* | 3/2016 | Henley | G06F 11/366 714/57 |
| 2016/0098848 A1* | 4/2016 | Zamanakos | G06T 11/206 345/440 |

(Continued)

OTHER PUBLICATIONS

U.S. Appl. No. 15/085,965, filed Mar. 30, 2016, Rosenzweig, et al.

(Continued)

*Primary Examiner* — Hamza N Algibhah
(74) *Attorney, Agent, or Firm* — Robert C. Kowert; Meyertons, Hood, Kivlin, Kowert & Goetzel, P.C.

(57) ABSTRACT

Methods, systems, and computer-readable media for monitoring of media pipeline health using tracing are disclosed. At a plurality of stages of a media delivery pipeline, tracing metadata is generated for elements of a media stream. The tracing metadata comprises a content identifier, a segment identifier, and a stage identifier. The tracing metadata is generated from the plurality of stages and sent to a metadata repository using instrumentation of components that implement the plurality of stages. A problematic stage within the plurality of stages is identified based at least in part on analysis of the tracing metadata.

20 Claims, 9 Drawing Sheets

(56) References Cited

U.S. PATENT DOCUMENTS

| | | | |
|---|---|---|---|
| 2016/0134931 A1* | 5/2016 | Song | H04N 21/44004 |
| | | | 725/109 |
| 2016/0249075 A1* | 8/2016 | Ireton | H04N 21/431 |
| 2017/0070415 A1* | 3/2017 | Bell | H04L 43/16 |
| 2017/0142067 A9* | 5/2017 | Pietrowicz | H04L 63/0254 |

OTHER PUBLICATIONS

Digital Video Broadcasting (DVB); Measurement guidelines for DVB systems, ETSI Technical Report 101 290 V1.2.1, European Telecommunications Standards Institute, May 2001. Retrieved from: http://www.etsi.org/deliver/etsi_tr/101200_101299/101290/01.02.01_60/tr_101290v010201p.pdf, pp. 1-175.

Internet Group Management Protocol, Version 3, RFC 3376, The Internet Society, Oct. 2002. Retrieved from: https://tools.ietf.org/html/rfc3376, pp. 1-53.

Matthias Laabs, "SDI over IP—seamless signal switching in SMPTE 2022-6 and a novel multicast routing concept," European Broadcasting Union, Nov. 2012. Retrieved from: https://tech.ebu.ch/docs/techreview/trev_2012-Q4_SDI-over-IP_Laabs.pdf, pp. 1-7.

Wes Simpson, "SMPTE 2022 and the Future of Video Over IP," TV Technology, Jul. 2013. Retrieved from: http://www.tvtechnology.com/insight/0083/smpte--and-the-future-of-video-over-ip/220188, pp. 1-6.

* cited by examiner

MONITORING OF MEDIA PIPELINE HEALTH USING TRACING

BACKGROUND

Internet-based video streaming is increasingly the choice of viewers who seek convenient access to video outside of conventional video distribution channels (including over-the-air broadcasts, cable TV, satellite TV, and prerecorded physical media). Using streaming technologies, viewers may access channels of live video as well as prerecorded video from libraries of video assets that are accessible over an Internet connection. In some cases, streaming video is viewable on a wide range of devices, including desktop computers and laptop computers, tablets, smartphones, wearable computers, and specialized devices such as smart televisions. The flexibility and convenience of streaming video are responsible in part for its widespread adoption.

However, the distribution and delivery pipeline for streaming video is typically a complicated one, and the pipeline may break down at any of several points. A video asset or live stream may first be acquired, e.g., from a broadcaster. The video may then be processed and transformed in any of several ways (potentially including compression, encryption, and other forms of encoding) for eventual distribution to viewers. A hierarchy of servers over a wide geographical area may be used to deliver the video to many viewers in an efficient manner. The viewer may then attempt to play the video on a viewing device. If the pipeline has failed at any point, then the video may fail to play or may play in an unsatisfactory manner (e.g., choppy or in a low resolution). Diagnosing the problem may prove difficult due to the complexity of the pipeline. In addition, diagnosis may be complicated by the numerous vendors and entities who are responsible for various components of the pipeline, from the broadcaster to the vendor of the client device or its software.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for monitoring of media pipeline health using tracing are described. Using the techniques described herein, elements of streaming media such as video may be tagged with tracing metadata at various stages of a media delivery pipeline. The stages may include, for example, an acquisition stage, an encoding stage, a packaging stage, an origin server stage, a content delivery network (CDN) stage, and/or a player stage on the client device. Tracing metadata may be generated multiple times per stage (e.g., on input and output) and/or for multiple sub-stages within a stage. The tracing metadata may include a content identifier (e.g., uniquely identifying a live channel or pre-recorded asset from a library), a segment identifier, a stage (or sub-stage) identifier, and a timestamp. At least a portion of the tracing metadata may be passed from one stage to the next stage with the corresponding media, and the tracing metadata may also be sent to a metadata repository or other centralized component. The health of the pipeline may be monitored using analysis of the tracing metadata in the metadata repository. The analysis may produce a visualization of the health of the pipeline, e.g., as a graph of connected nodes with visual indicators of the pipeline's health at various portions of the graph. The health monitoring may be performed in a proactive and periodic manner to identify problems in the pipeline. Additionally, when a report of problematic playback is received for a particular client device, the tracing metadata may be used to identify a particular component as the source of the problematic playback. The pipeline may include redundant components and paths, and the pipeline may be rerouted to bypass a problematic component. In this manner, automated techniques may be used to diagnose problems in a complex media delivery pipeline that includes multiple stages.

Figure 1:
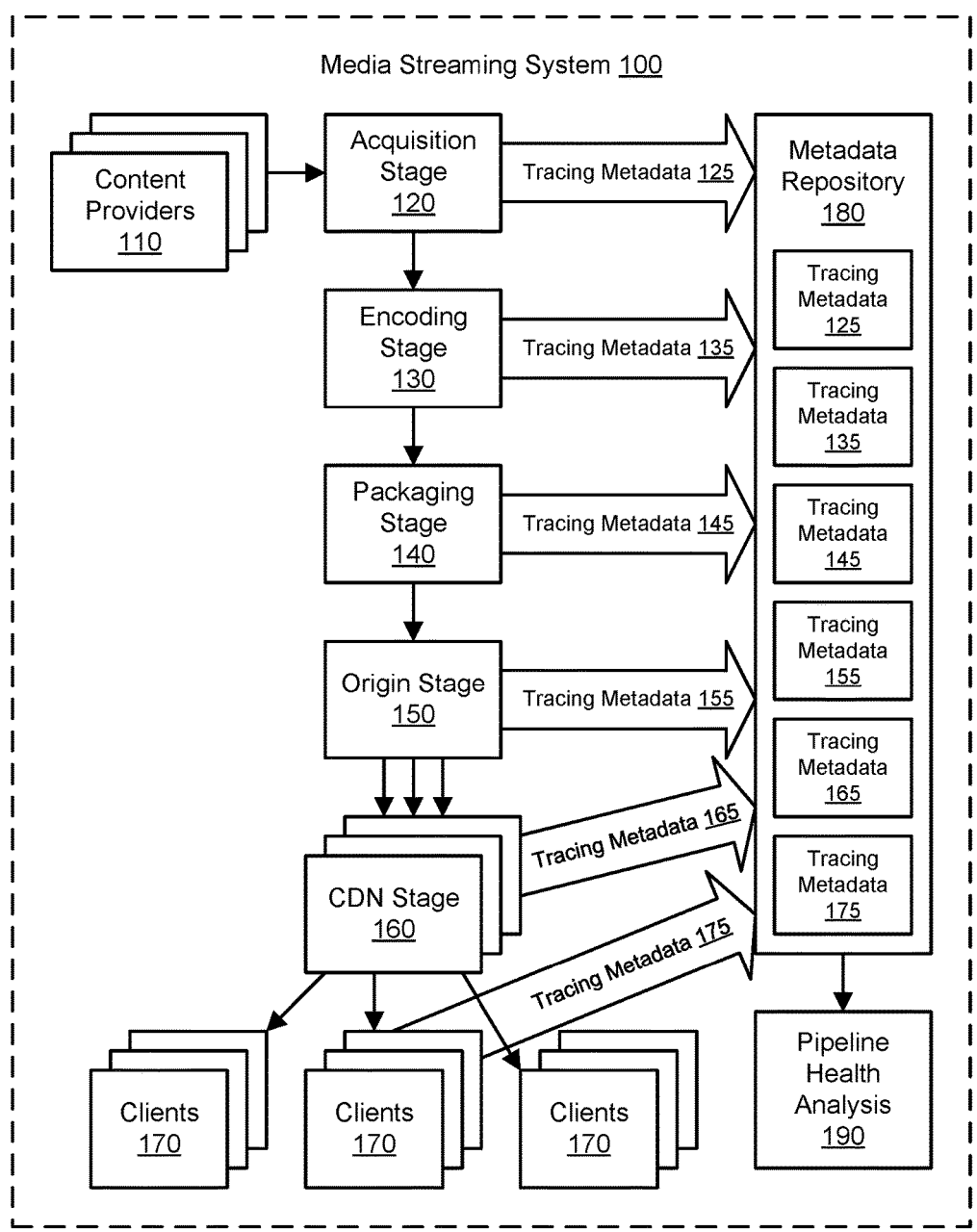
FIG. 1 illustrates an example system environment for monitoring of media pipeline health using tracing, according to one embodiment.

FIG. 1 illustrates an example system environment for monitoring of media pipeline health using tracing, according to one embodiment. A media streaming system 100 may implement a media delivery pipeline to stream media, such as video or audio, to client computing devices 170 for playback on those devices. The media may represent live media content (e.g., a live stream associated with a particular channel) or prerecorded media content (e.g., a media asset from a library of streamable media). The pipeline may include multiple stages; the stages may represent various transformations of the media and/or various distribution paths for the media (e.g., from device to device over the internet).

The client computing devices 170 may be associated with and/or operated by one or more clients of the media streaming system 100; as used herein, the terms "client computing device," "client device," and "client" may be used interchangeably. The client computing devices 180A-180N may be coupled to portions of the media streaming system 100 via one or more networks, potentially including the Internet. A client may represent a customer (e.g., an individual or group entity) of the media streaming system 100. Typically, a user associated with one of the client computing devices 170 may have an account that has privileges to access media content provided by the media streaming system 100. The access may be fee-based or may instead be free to the user (potentially with advertisements in the streaming media or player software). However, some media may also be streamable to users without accounts or other arrangements, e.g., on websites that provide streaming video.

It is contemplated that the media delivery pipeline implemented by the media streaming system 100 may include various combinations of stages, including the particular combination illustrated in FIG. 1. In one embodiment, as shown in FIG. 1, the stages of the pipeline may include an acquisition stage 120, an encoding stage 130, and a packaging stage 140. At the acquisition stage 120, a signal representing the media may be acquired from one or more content providers 110, e.g., broadcasters. The signal may be acquired by the media streaming system 100 using any of several suitable transport mechanisms, including a camera feed, a microphone feed, an internet protocol (IP) connection, an asynchronous serial interface (ASI) connection, and so on. At the encoding stage 130, the media may be transformed into a particular video or audio format, e.g., using a particular codec. The encoding stage 130 may include compression, or a separate compression stage may be used in the pipeline. Additionally, at the encoding stage 130, the media may be divided into segments or chunks of a fixed or variable size. For example, the media may be divided into segments of approximately ten seconds in length for delivery via HTTP over TCP/IP. At the packaging stage 140, the media may be packaged and multiplexed (or "muxed") for playback on particular playback software (referred to herein as a "player") and/or a particular type of client device (e.g., a particular category of smartphone). In one embodiment, additional stages of the pipeline may perform additional transformations of the media, such as encryption performed at an encryption stage, decoding performed at a decoding stage, framerate conversion performed at a framerate conversion stage, scaling performed at a scaling stage, advertisement insertion performed at an advertisement insertion stage, and/or other types of image processing (e.g., color transformation) performed at an image processing stage. Alternatively, one of the additional transformations may be performed as a sub-stage of another stage such as the encoding stage 130.

In one embodiment, as shown in FIG. 1, the stages may include an origin server stage (also referred to as an origin stage) 150 and a content delivery network (CDN) stage 160. The pipeline may include one or more origin servers and a larger number of CDN servers. The origin server(s) may act as distribution points to the CDN servers. The CDN servers may be located closer to clients in terms of geography and/or network latency in order to provide efficient distribution of the media. A single origin server may provide a media stream to many CDN servers, and each CDN server may then respond to requests for media from many client devices. In some cases, such as for prerecorded media, the origin server may persistently store the media (or segments thereof) for an indefinite period of time, while the CDN servers may cache segments of the media for a more limited period of time. If a client requests particular content that is not available in the cache at a CDN server, then the CDN server may request the content from the origin server and then deliver the content to the requesting client. At the origin server stage 150, the media may be sent from the origin server to one or more CDN servers. If other stages such as the acquisition stage 120, encoding stage 130, and/or packaging stage 140 are performed at the origin server, then the origin stage 150 may include those stages or include corresponding sub-stages. However, it is also contemplated that the origin server stage 150 may represent a distinct stage relative to the acquisition stage 120, encoding stage 130, and/or packaging stage 140. At the CDN stage 160, the media may be sent from a CDN server to a client device 170, e.g., as requested by the client device. In one embodiment, the stages may also include a playback stage that represents attempted playback by a player (e.g., implemented in player software) on a client device 170.

In one embodiment, tracing metadata may be generated for one or more portions or elements of a media stream (e.g., segments of the stream) at particular stages of the media delivery pipeline. The tracing metadata may include a content identifier for the media stream. The content identifier may be globally unique within the context of the media streaming system. For example, if the media represents a live video stream, then the content identifier may indicate a particular channel. As another example, if the media represents prerecorded media content, then the content identifier may indicate a particular media asset from a library of media. In one embodiment, the content identifier may be generated once (e.g., at the acquisition stage 120) and then propagated from stage to stage. The tracing metadata may include a segment identifier for each segment or other element. For example, the segment identifiers may be ordered to reflect a sequence of the segments or elements of the streaming media. In one embodiment, the segment identifier may be generated first at one stage (e.g., at the encoding stage 130) and then propagated from stage to stage. As used herein, generating tracing metadata may include creating at least a portion of the metadata for the first time at a stage and/or reusing at least a portion of the metadata from a previous stage or other source. The tracing metadata may include a stage identifier for the particular stage. The stage identifier may indicate the type of stage (e.g., acquisition, encoder, packager, origin, CDN, playback) and potentially the particular instance, component, or device within the stage that generates the metadata. In some circumstances, a stage identifier may represent a sub-stage of a particular stage. The tracing metadata may include a timestamp, e.g., as expressed in Coordinated Universal Time (UTC) or any other suitable time standard.

In one embodiment, the tracing metadata for a particular stage may be generated more than once within that stage, e.g., on input and output and/or at multiple sub-stages within the stage. For example, the tracing metadata may be generated both when a segment is received and also when a segment is transferred to the next stage of the pipeline. In such an embodiment, the timestamps may differ for the first or "input" set of tracing metadata and the second or "output" set of tracing metadata at a particular stage. The tracing metadata may also include stage-specific elements, e.g., indicating errors that occur in any attempted operations at the stage. In various embodiments, tracing metadata may not be generated at every stage of the pipeline. However, analysis of the health of the pipeline will typically improve when tracing data is generated by a greater number of stages.

The tracing metadata (or at least a portion thereof) may be attached to the one or more segments or other elements before the segments or elements are sent to the next stage of the pipeline. A segment or portion may said to be tagged with the tracing metadata for that segment or portion. The content identifier and segment identifier may typically be generated once and then propagated from stage to stage, while the stage identifier may be omitted from the segment sent to the next stage or sent but then discarded at the next stage. As shown in FIG. 1, the tracing metadata may also be sent to a centralized component such as a metadata repository 180. In particular, the acquisition stage 120 may generate and send tracing metadata 125, the encoding stage 130 may generate and send tracing metadata 135, the packaging stage 140 may generate and send tracing metadata 145, the origin server stage 150 may generate and send tracing metadata 155, the CDN stage 160 may generate and send tracing metadata 165, and/or the playback stage at the clients 170 may generate and send tracing metadata 175. Each stage may include individual components that perform the function(s) associated with that stage. The components at the various stages of the pipeline may be instrumented in order to generate tracing metadata, e.g., using an appropriate development kit that includes program code for generating and sending the metadata.

The tracing metadata may be sent to the metadata repository 180 substantially in real time, or at least without a significant delay. In one embodiment, the tracing data may be packaged and then sent when a sufficient amount (potentially for multiple different media streams) has accumulated at the stage. Typically, most stages that send tracing data to the metadata repository 180 may do so without being prompted by the metadata repository or other centralized component of the media streaming system. In some embodiments, not every stage may send tracing metadata without being prompted by a centralized component. For example, the CDN servers at the CDN stage 160 may not generate or send tracing data 165 automatically, but they may generate and periodically send logs (potentially on request) that may contain tracing metadata 165 or that can otherwise be used to infer the health of media streams at the CDN stage. The metadata repository 180 may be maintained by the media streaming system 100 using locally accessible storage resources or external storage resources such as a database service or system.

Using a functionality for pipeline health analysis 190, the health of the pipeline may be monitored using the tracing metadata. In one embodiment, a problematic stage may be determined based (at least in part) on analysis of the tracing metadata. A problematic stage may represent a stage or component of a stage that is deemed responsible for problematic delivery or problematic playback of media. The analysis may be performed either reactively or proactively. The reactive analysis may typically be performed after a report of problematic delivery is received, e.g., from a client (e.g., an end user operating a client computing device on which playback was attempted) or from another organization involved in the pipeline such as a broadcaster who generated the media content, a publisher of player software on the client device, a publisher of operating system software on the client device, a distributor or vendor of the client device, and so on. Problematic delivery (also referred to herein as problematic playback) may include playback that never begins, playback that begins but then stops prematurely, playback with sound but not video, playback with video but not sound, playback with low-quality or distorted video, playback with low-quality or distorted sound, playback with improperly synchronized sound and video, slow or choppy playback, and/or any other form of attempted playback that does not meet client expectations. In one embodiment, the pipeline health analysis 190 may be offered as a service to a plurality of clients. The pipeline health analysis is discussed in greater detail with respect to FIG. 5 through FIG. 7.

In some embodiments, components of the media streaming system 100 such as servers, storage resources, and network resources may be implemented using resources of a provider network. The provider network may be set up by an entity such as a company or a public sector organization to provide one or more services (such as various types of cloud-based computing or storage) accessible via the Internet and/or other networks to clients. The provider network may include numerous data centers hosting various resource pools, such as collections of physical and/or virtualized computer servers, storage devices, networking equipment and the like (e.g., implemented using the example computing system 3000 described below with regard to FIG. 9), needed to implement and distribute the infrastructure and services offered by the provider network. In some embodiments, the provider network may provide computing resources and services, such as services associated with the media streaming system 100; storage services, such as a block-based storage service, key-value based data stores, or various types of database systems; and/or any other type of network-based services. Clients may access these various services offered by provider network 100 via one or more networks, potentially including the Internet. Likewise, network-based services may themselves communicate and/or make use of one another to provide different services. For example, computing resources offered in units called "instances," such as virtual or physical compute instances or storage instances, may make use of particular data volumes, providing virtual block storage for the compute instances.

The provider network may implement or provide a multi-tenant environment such that multiple clients (e.g., content providers 110 and/or end user clients 170) may access or use a particular resource or service in a substantially simultaneous manner. Functionality of the media streaming system 100, such as a pipeline health analysis service 190, may be offered to multiple clients (in a substantially simultaneous manner) in such a multi-tenant provider network, such that the same computational and storage resources associated with the media streaming system may be used on behalf of different clients over the same window of time. The different clients may represent different individuals and/or different organizations that may pay the provider network for access to one or more services and/or resources. The provider network may include a fleet of computing devices, also referred to herein as servers, hosts, or instances, which are configured to execute software on behalf of clients of the provider network. In one embodiment, a fleet of servers may grow or shrink as individual servers are provisioned or deprovisioned using resources of the provider network. In one embodiment, the fleet of servers may grow or shrink as individual servers are added to or removed from a dedicated fleet by an administrator.

The content providers 110 may be individuals or entities who provide streaming media content to the media streaming system 100 for potential delivery to the clients 170. The content providers 110 as illustrated in FIG. 1 may correspond to computing devices that are connected to the media streaming system 100 over one or more networks, potentially including the Internet. The computing devices associated with the content providers 110 may encompass any type of hardware and software that are configurable to submit requests to the media streaming system 100 (e.g., implemented using the example computing system 3000 described below with regard to FIG. 9). Similarly, the computing devices associated with the clients 170 may encompass any type of hardware and software that are configurable to consume streaming media provided by the media streaming system 100 (e.g., implemented using the example computing system 3000 described below with regard to FIG. 9). For example, a client computing device may include a dedicated media player, a suitable version of a web browser, and/or a plug-in module or other type of code module configured to execute as an extension to or within an execution environment provided by a web browser or other form of client software. In some embodiments, such a client application may include sufficient protocol support (e.g., for a suitable version of Hypertext Transfer Protocol [HTTP]) for generating and processing network-based service requests.

Content providers 110 and/or client computing devices 170 may convey network-based requests to the media streaming system 100 via one or more external networks. In various embodiments, the external network(s) may encompass any suitable combination of networking hardware and protocols necessary to establish network-based communications between computing devices and the media streaming system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given computing device and the media streaming system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given computing device and the Internet as well as between the Internet and the media streaming system 100. It is noted that in some embodiments, computing devices for content providers 110 and/or clients 170 may communicate with the media streaming system 100 using a private network in addition to or instead of the public Internet.

Figure 9:
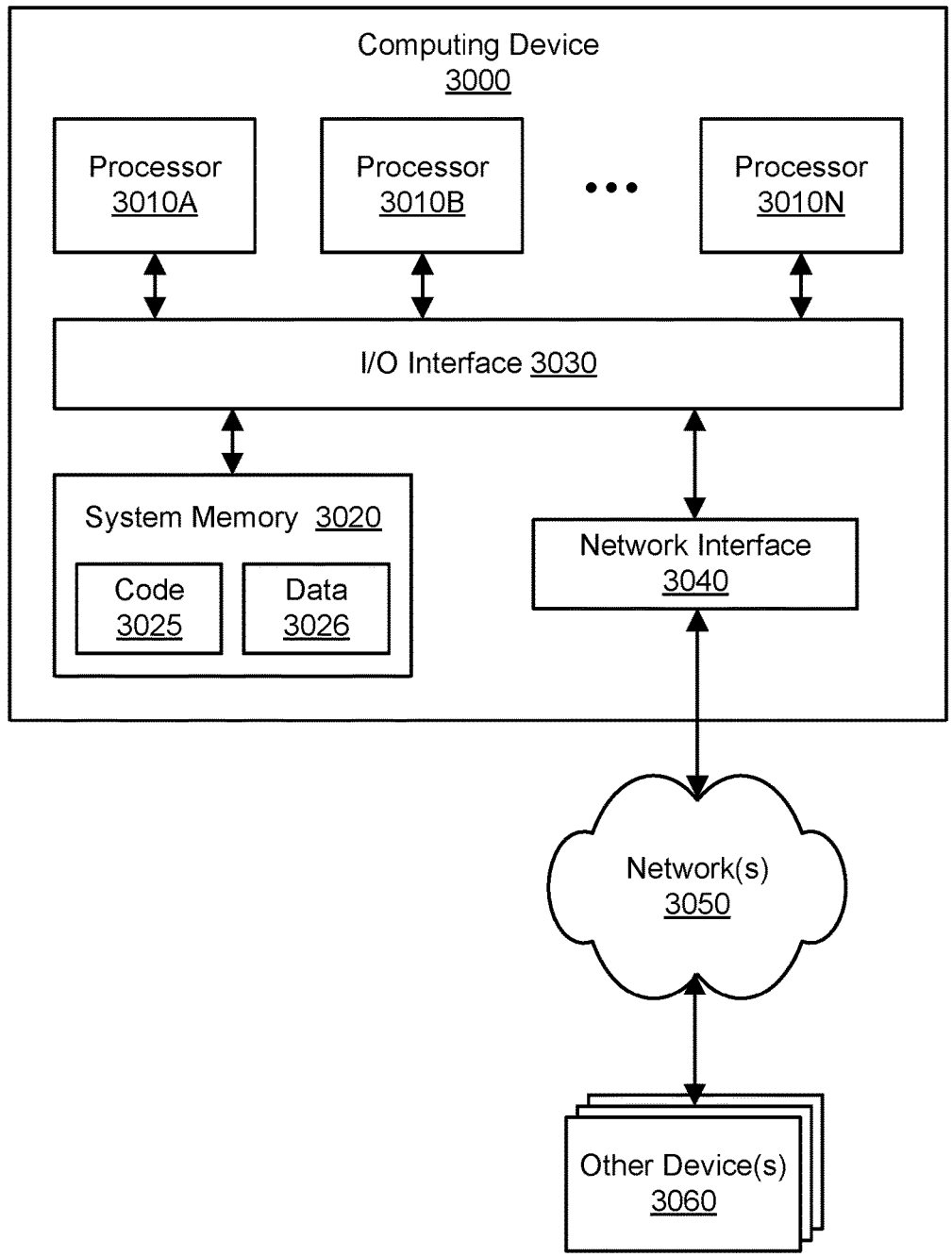
FIG. 9 illustrates an example computing device that may be used in some embodiments.

The media streaming system 100 may include a plurality of computing devices, any of which may be implemented by the example computing device 3000 illustrated in FIG. 9. In various embodiments, portions of the described functionality of the media streaming system 100 may be provided by the same computing device or by any suitable number of different computing devices. If any of the components of the media streaming system 100 are implemented using different computing devices, then the components and their respective computing devices may be communicatively coupled, e.g., via a network. Each of the illustrated components (such as the various stages 120, 130, 140, 150, and 160 as well as the metadata repository 180 and pipeline health analysis functionality 190) may represent any combination of software and hardware usable to perform their respective functions. Multiple computing devices may typically be used to implement the multi-stage pipeline. In some circumstances, more than one stage may be performed by the same computing device.

It is contemplated that the media streaming system 100 may include additional components not shown, fewer components than shown, or different combinations, configurations, or quantities of the components shown. For example, although various stages such as stages 120, 130, 140, 150, and 160 are shown for purposes of example and illustration, it is contemplated that different quantities and configurations of stages may be used. Additionally, it is contemplated that some of the stages 120, 130, 140, 150, and 160 may include redundant components that collectively provide the functionality of the particular stage. Aspects of the functionality described herein may be performed, at least in part, by components outside of the media streaming system 100.

Figure 2:
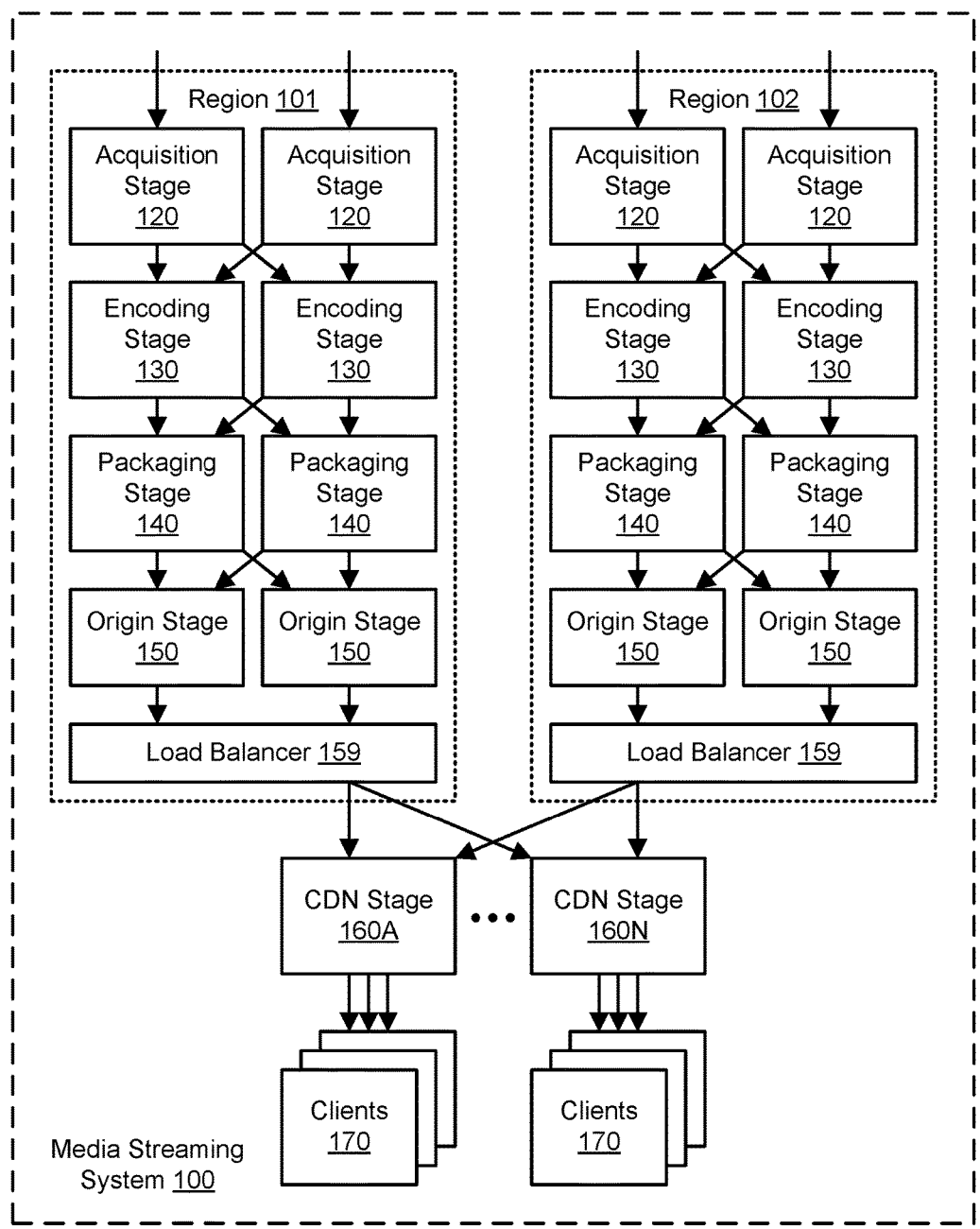
FIG. 2 illustrates further aspects of the example system environment for monitoring of media pipeline health using tracing, including redundant components of stages, according to one embodiment.

FIG. 2 illustrates further aspects of the example system environment for monitoring of media pipeline health using tracing, including redundant components of stages, according to one embodiment. As discussed above, at least some of the stages 120, 130, 140, 150, and 160 may include redundant components that collectively provide the functionality of the particular stage. The redundancy of components in the same stage may permit the pipeline to be rerouted to bypass a problematic component in that stage. As shown in the example of FIG. 2, the media streaming system 100 may be divided into multiple regions such as region 101 and region 102. The different regions 101 and 102 may represent different zones within a provider network whose resources are used to implement the media streaming system 100. The different regions 101 and 102 may represent geographical divisions of underlying components, including different nations, states or political subdivisions, continents, arbitrary zones, or data centers. Each of the regions 101 and 102 may implement a media delivery pipeline with multiple stages. Within each region, a particular stage may be implemented with redundancy. For example, multiple components operating in parallel may implement the acquisition stage 120, the encoding stage 130, the packaging stage 140, and the origin stage 150 within each region. As illustrated in FIG. 2, the redundant components within a stage in a particular zone may also implement redundancy with respect to the connections to components in the previous stage and/or in the next stage. Each of the regions 101 and 102 may also include a load balancer fleet 159. The load balancers 159 may efficiently distribute requests between the origin state 150 and the CDN stage, as represented by CDN components 160A-160N. The CDN stage 160A-160N may respond to requests for streaming media from clients 170. As discussed above, the media streaming system 100 may typically have many clients 170 per CDN server and many CDN servers per origin server.

Figure 3:
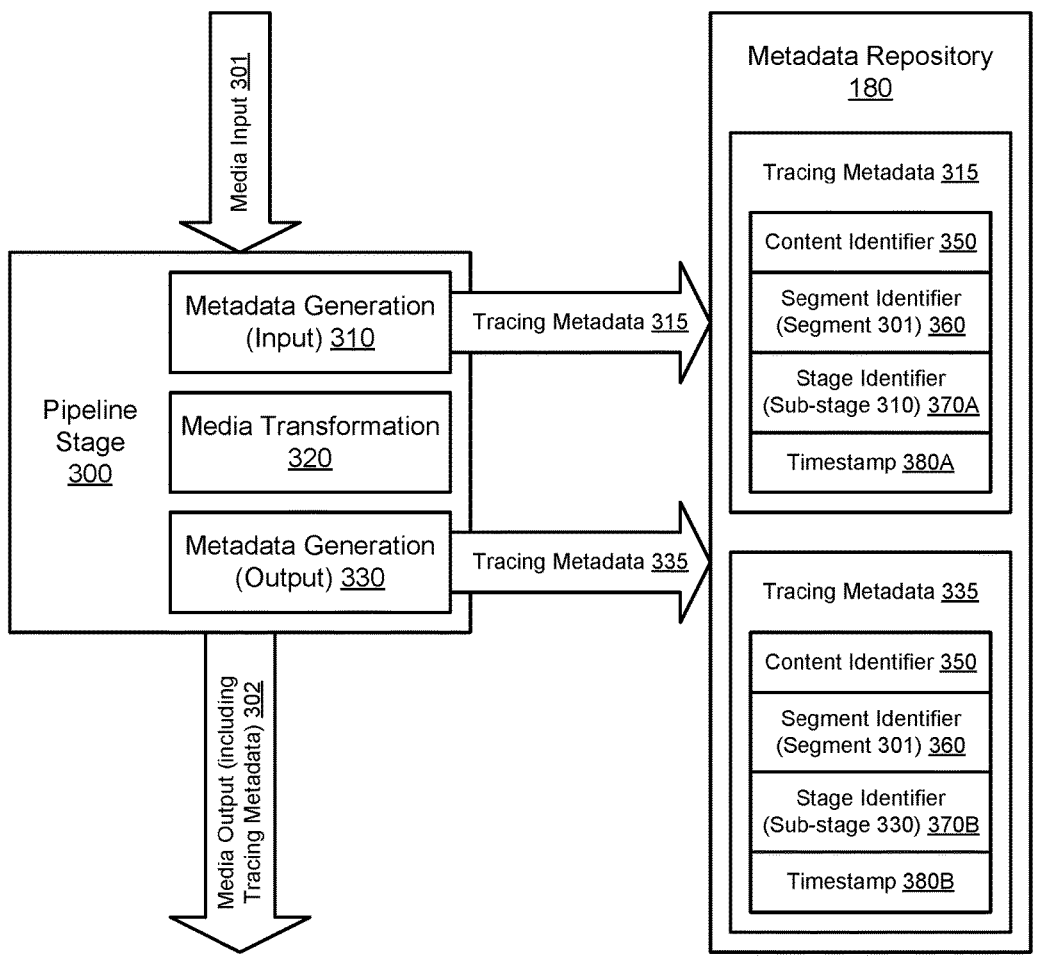
FIG. 3 illustrates the generation of tracing metadata at different points of a stage, according to one embodiment.

FIG. 3 illustrates the generation of tracing metadata at different points of a stage, according to one embodiment. As discussed above, the tracing metadata for a particular stage may be generated more than once within that stage, e.g., on input and output. As shown in the example of FIG. 3, a pipeline stage 300 may include metadata generation (input) 310 to generate tracing metadata 315 when media input (such as a segment) 301 is received (e.g., from the previous stage) and also metadata generation (output) 330 to generate tracing metadata 335 when media output (such as a segment) 302 is generated or sent (e.g., to the next stage). For some types of stages, such as the acquisition stage 120, the input 301 may represent one or more portions or other elements of the media stream rather than segments. In between the metadata generation (input) 310 and metadata generation (output) 330, the stage 300 may optionally perform a media transformation 320 on the media. The pipeline stage 300 may represent one or more of the stages shown in FIG. 1, e.g., the acquisition stage 120, encoding stage 130, packaging stage 140, origin stage 150, and/or CDN stage 160.

In one embodiment, tracing metadata may be generated one or more times for each element of media input 301 of a media stream at a particular pipeline stage 300 of the media delivery pipeline. As shown in the example of FIG. 3, the tracing metadata 315 (generated on input) and tracing metadata 335 (generated on output) may include a content identifier for the media stream. The content identifier 350 may be globally unique within the context of the media streaming system 100. For example, if the media represents a live video stream, then the content identifier 350 may indicate a particular channel. As another example, if the media represents prerecorded media content, then the content identifier 350 may indicate a particular media asset from a library of streamable media. In one embodiment, the content identifier 350 may be generated once (e.g., at the acquisition stage 120) and then propagated from stage to stage. The tracing metadata 315 and 335 may include a segment identifier 360 for the media input (e.g., segment) 301. For example, the segment identifiers may be ordered to reflect a sequence of the segments or other elements in the streaming media. In one embodiment, the segment identifier 360 may be generated once (e.g., at the encoding stage 130) and then propagated from stage to stage. The tracing metadata 315 and 335 may include a stage identifier for the particular stage 300. The stage identifiers 370A and 370B may indicate the type of stage (e.g., acquisition, encoder, packager, origin, CDN, playback), the sub-stage (if any, e.g., input sub-stage 310 for stage identifier 370A and output sub-stage 330 for stage identifier 370B), and potentially the particular instance, component, or device within the stage that generates the metadata. The tracing metadata may include a timestamp. As shown in the example of FIG. 3, the timestamp 380A for the tracing metadata 315 generated on input may differ from the timestamp 380B for the tracing metadata 335 generated on output. Differing timestamps within a stage or from stage to stage may be used to diagnose the source of slow delivery in the media delivery pipeline.

The tracing metadata (or at least a portion thereof) 335 may be attached to the output media (e.g., segment) 302 before the output is sent to the next stage of the pipeline. The output 302 may said to be tagged with the tracing metadata for that segment. The content identifier 350 and segment identifier 360 may typically be generated once and then propagated from stage to stage, while the stage identifier 370 may be omitted from the segment 302 sent to the next stage or sent but then discarded at the next stage. As shown in FIG. 3, the tracing metadata 315 and 335 may be sent to a metadata repository 180 or other centralized component.

The tracing metadata 315 and 335 may be sent to the metadata repository 180 substantially in real time, or at least without a significant delay. In one embodiment, the tracing data 315 and 335 may be packaged and then sent when a sufficient amount (potentially for multiple different media streams) has accumulated at the stage 300. The stage 300 may send the tracing data 315 and 335 with or without being prompted by the metadata repository 180 or other centralized component of the media streaming system. In one embodiment, the tracing metadata 315 and/or 335 may be stored in a log by the pipeline stage 300.

Figure 4:
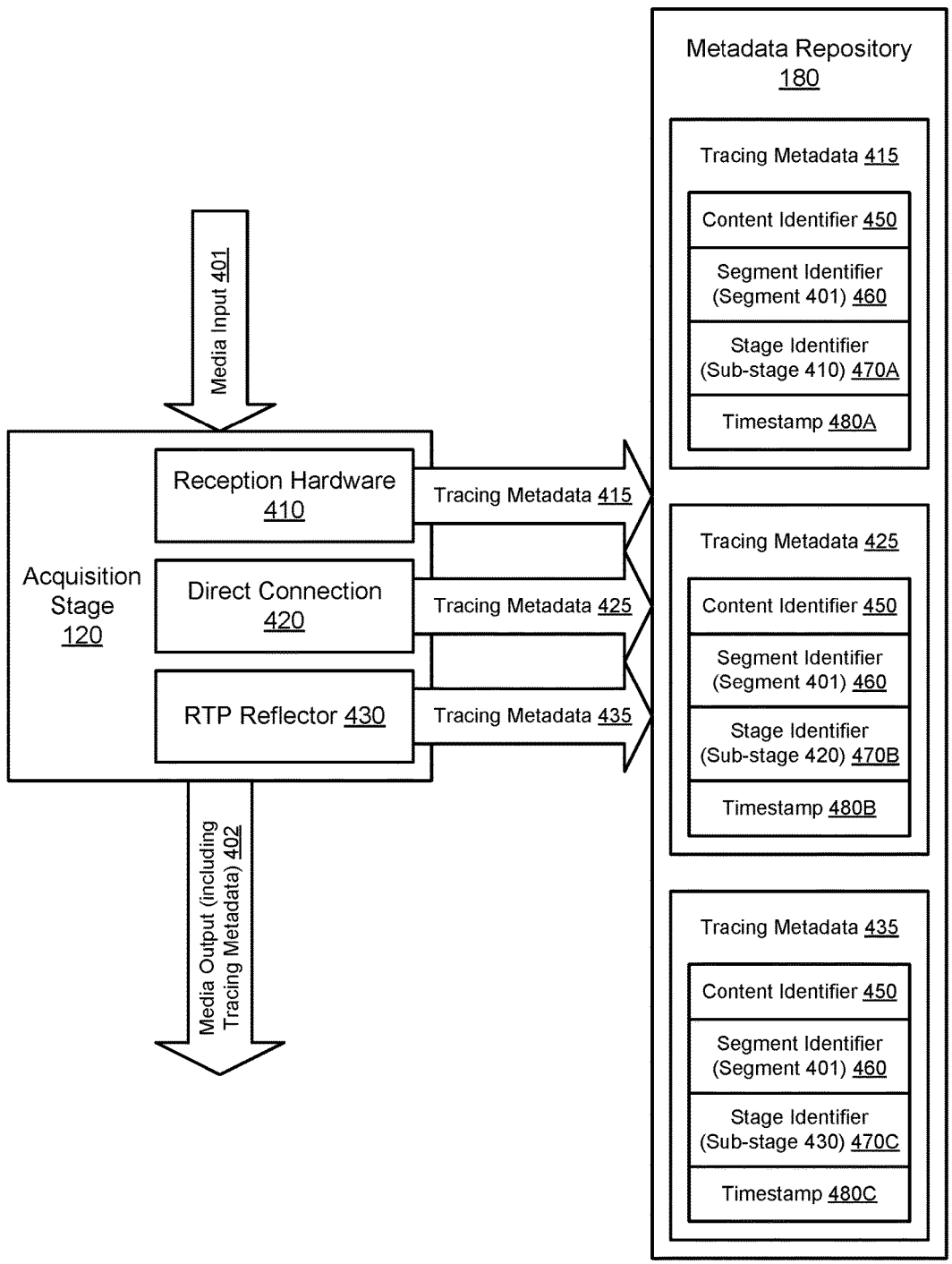
FIG. 4 illustrates the generation of tracing metadata at different sub-stages of a stage, according to one embodiment.

FIG. 4 illustrates the generation of tracing metadata at different sub-stages of a stage, according to one embodiment. As discussed above, the tracing metadata for a particular stage may be generated more than once within that stage, e.g., at multiple sub-stages within the stage. As shown in the example of FIG. 4, the acquisition stage 120 may include sub-stages for reception hardware 410, direct connection 420, and a real-time transport protocol (RTP) reflector 430. Upon receipt and processing of media input 401, the reception hardware sub-stage 410 may generate and send tracing metadata 415, the direct connection sub-stage 420 may generate and send tracing metadata 425, and the RTP reflector sub-stage 430 may generate and send tracing metadata 435. Additionally, the acquisition stage 120 may generate and send tracing metadata on receipt of media input 401 to the stage and on sending of media output 402 from the stage, as discussed above.

As shown in the example of FIG. 4, the tracing metadata 415, 425, and 435 may include a content identifier 450 for the media stream. The tracing metadata 415, 425, and 435 may include a segment identifier 460 for the portion of the media stream in the media input 401. The tracing metadata 415 may include a stage identifier 470A of the sub-stage 410, whereas the tracing metadata 425 may include a stage identifier 470B of the sub-stage 420, and the tracing metadata 435 may include a stage identifier 470C of the sub-stage 430. The tracing metadata 415, 425, and 435 may include a timestamp. As shown in the example of FIG. 4, the timestamps 480A, 480B, and 480C in the respective tracing metadata 415, 425, and 435 may differ. Differing timestamps within a stage or from sub-stage to sub-stage may be used to diagnose the source of slow delivery in the media delivery pipeline.

Figure 5:
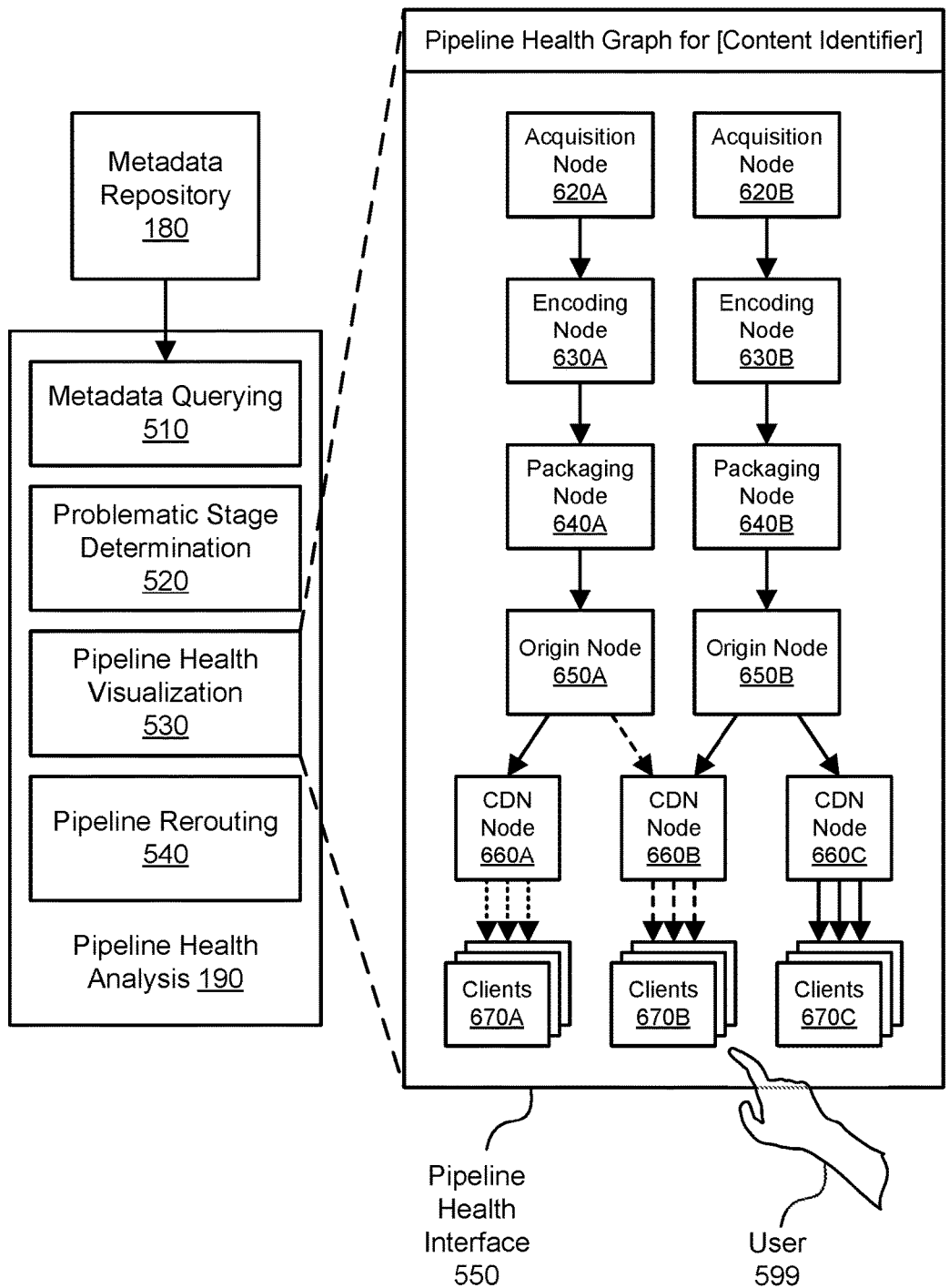
FIG. 5 illustrates a visualization of pipeline health for a particular media stream using a graph, according to one embodiment.

FIG. 5 illustrates a visualization of pipeline health for a particular media stream using a graph, according to one embodiment. Using the pipeline health analysis functionality 190, the health of the pipeline may be monitored and/or visualized using the tracing metadata in the metadata repository 180. The pipeline health analysis 190 may include functionalities (e.g., components) for metadata querying 510, problematic stage determination 520, pipeline health visualization 530, and pipeline rerouting 540. The metadata querying 510 may query the metadata repository 180 for tracing metadata relevant to one or more particular media streams (e.g., as indicated by a content identifier), one or more particular elements or segments of a stream (e.g., as indicated by a segment identifier), one or more particular stages and/or sub-stages (e.g., as indicated by a stage identifier), and/or in a particular window of time (e.g., as indicated by timestamps in the tracing metadata). The metadata querying 510 may be performed automatically (e.g., to perform period monitoring of pipeline health) or based on user input (e.g., in response to a report of problematic delivery of a media stream).

Using the functionality for problematic stage determination 520, a problematic stage (e.g., a component that is responsible for a playback problem) may be determined based (at least in part) on analysis of the tracing metadata queried from the metadata repository 180. The analysis may be performed either reactively or proactively. The reactive analysis may typically be performed after a report of problematic delivery (including problematic playback) is received, e.g., from a client (e.g., an end user operating a client computing device on which playback was attempted) or from another organization involved in the pipeline such as a broadcaster who generated the media content, a publisher of player software on the client device, a publisher of operating system software on the client device, a distributor of the client device, and so on. Problematic delivery may include playback that never begins, playback that begins but then stops prematurely, playback with sound but not video, playback with video but not sound, playback with low-quality or distorted video, playback with low-quality or distorted sound, playback with improperly synchronized sound and video, slow or choppy playback, and/or any other form of attempted playback that does not meet client expectations.

To perform proactive analysis, elements of the tracing metadata may periodically be retrieved from the database 180 and analyzed to monitor the health of the pipeline. Using the tracing metadata, a graph or other visualization of a flow of the media stream may be generated using the pipeline health visualization functionality 530. The visualization may be based on metadata for one content stream or set of segments or for many different content streams. When the visualization reflects many different content streams over a particular period of time, elements of the tracing data may be sampled so that all of the tracing metadata for the period of time need not be analyzed. The visualization may be presented in a pipeline health interface 550 using any suitable user interface components such as one or more windows, and the interface may permit interaction by a user 599. As shown in the example of FIG. 5, the visualization may show a tree-like structure representing the flow of segments for a particular content identifier. In the pipeline health graph for the content identifier, the various stages (e.g., components) are nodes and the connections between the stages are edges. To determine the connections between the nodes for segments or other elements of the media content associated with the content identifier, elements of the tracing metadata may be correlated by their common content identifier and their segment identifiers.

In the example of FIG. 5, acquisition nodes 620A and 620B may represent multiple components in the acquisition stage 120; encoding nodes 630A and 630B may represent multiple components in the encoding stage 130; packaging nodes 640A and 640B may represent multiple components in the packaging stage 140; origin nodes 650A and 650B may represent multiple components in the origin server stage 150; CDN nodes 660A, 660B, and 660C may represent multiple components in the CDN stage 160; and client nodes 670A, 670B, and 670N may represent multiple components in the client or playback stage 170. In one embodiment, a node in the interface 550 may represent multiple components. For example, many client devices may be shown in aggregate form rather than as individual nodes, potentially with an indicator of the number of clients represented by the node. The pipeline health graph may show that one origin server such as node 650A provides media to several downstream CDN servers such as CDN nodes 660A and 660B, and each CDN server has connections with many clients. The interface 550 may represent a global view, e.g., of multiple regions, or it may instead be limited to a single region (e.g., based on input by the user 599).

The pipeline health graph may include one or more visual indicators of the health of various portions of the pipeline. The graph may include visual indicators of problematic delivery of the media stream in one or more portions of the media delivery pipeline. For example, a green node or edge may represent proper functioning of a node or connection between nodes, a yellow node or edge may represent slow delivery (e.g., as indicated by analysis of timestamps for segments), and a red node or edge may indicate a total failure of functionality of the node or connection between stages. Other visual indicators may also be used, such as different types of icons or textual labels to indicate the varying health of nodes and/or different types of lines or textual labels to indicate the varying health of transitions between nodes. As shown in the example of FIG. 5, the dotted lines between CDN node 660A and clients 670A may indicate a slow delivery of segments, while the differently dotted lines between the origin node 650A and CDN node 660B and clients 670B may indicate a total failure of delivery. In one embodiment, the user 599 may click on a node to trace forwards or backwards for one or more segments or streams. In one embodiment, the user 599 may click on a node to drill down into additional health analysis for a stage of the pipeline.

In one embodiment, a dashboard may be displayed with the interface 550 to show metrics, graphs, or status updates related to the health of the pipeline (e.g., related to network latency between components); the metrics, graphs, and status updates may change over time as additional analysis is performed. The dashboard and interface 550 may show historical pipeline health indicators as well as current health indicators. The pipeline health analysis 190 may also trigger other configurable actions, such as sending alerts to relevant administrators or clients or other systems, switching to backup components or pipelines, and so on. As discussed above, the pipeline health analysis 190 may be offered as a service to a plurality of clients. When the clients of the pipeline health analysis 190 also manage components of pipeline stages, the clients may instrument those components to provide tracing metadata to the repository 180 so that the metadata may be analyzed to provide suitable analysis for the clients.

Figure 6:
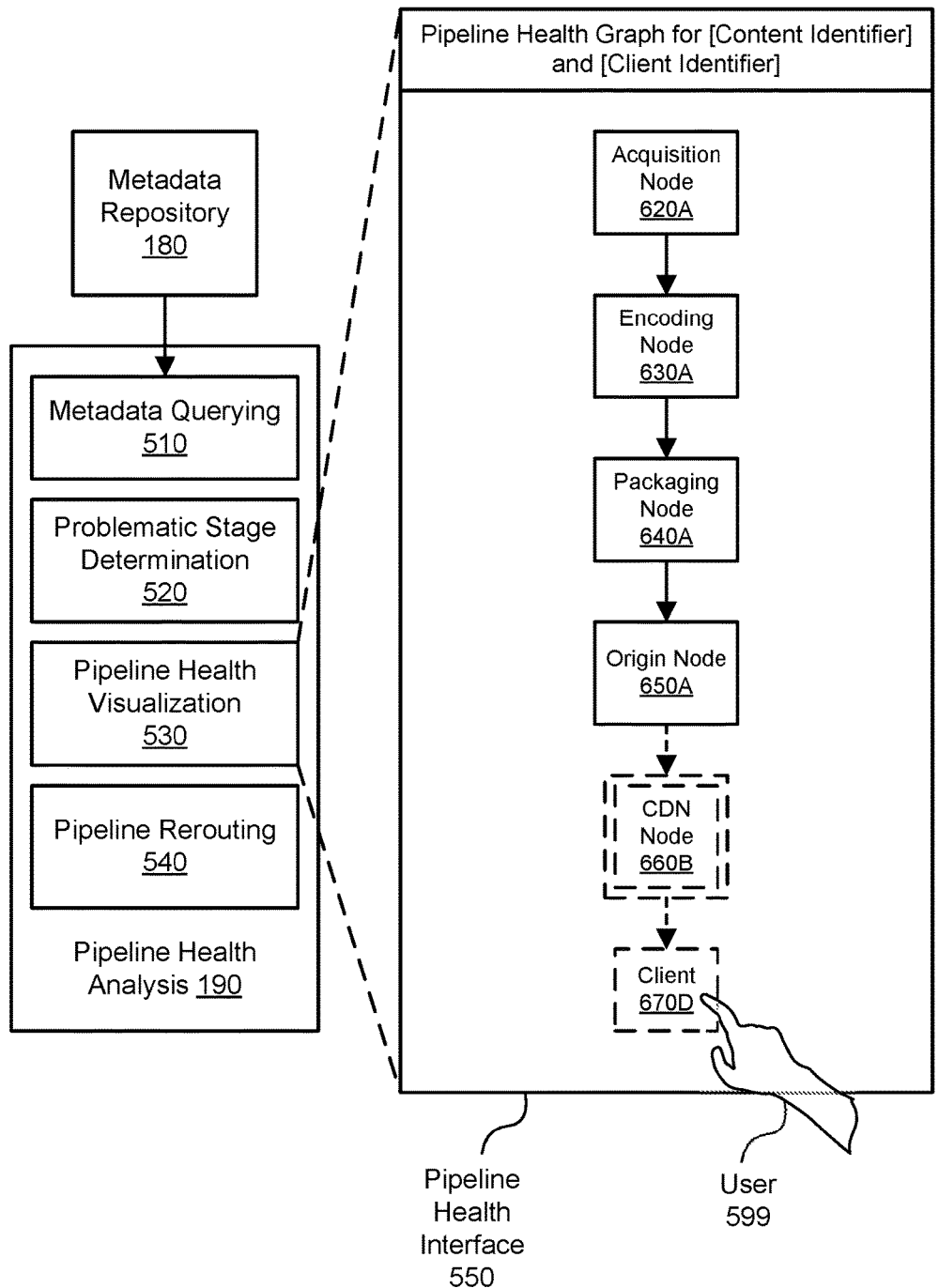
FIG. 6 illustrates a visualization of pipeline health for a particular client and particular media stream using a graph, including a depiction of a problematic stage, according to one embodiment.

FIG. 6 illustrates a visualization of pipeline health for a particular client and particular media stream using a graph, including a depiction of a problematic stage, according to one embodiment. To perform reactive analysis, relevant tracing metadata may be retrieved from the metadata repository or other centralized component. The relevant metadata may be associated with a particular content identifier as referenced in the report, e.g., indicating a particular channel or media asset from a library. The relevant metadata may also be associated with the particular client, e.g., with a connection between a CDN server and the particular client. The particular client may be identified in the metadata repository based on an IP address of the client device, an account identifier for the client with the media streaming service, a serial number or other unique identifier of the instance of player software on the client device, and/or any other suitable identifier of the client device itself. Even when media delivery has completely failed for a particular client, the client device may have sent a request for the media content, and tracing metadata may have been sent by the player software on the client device to the metadata repository 180. The stage identifier for such elements of tracing metadata may specifically indicate the client device or client account of the user of the device. When the player requests access to streaming media, it may request a manifest file, and it may repeatedly request the manifest file again while the media content is streamed. The manifest file may indicate where to obtain the requested content (e.g., a CDN server) and how to calculate the right segment. In one embodiment, the manifest file may also provide an address to send tracing metadata generated by the player (e.g., to the metadata repository 180).

In one embodiment, a graph or visualization of the flow of the media stream may be presented in a graphical user interface 550, and the user 599 may click on a node to trace a particular segment (or other portion) or stream forwards or backwards. For example, the user may click on a node 670D representing the particular client device of a client associated with a report of problematic delivery. The relevant metadata may be analyzed to trace one or more segments or other elements of the media stream from the client device back to one or more upstream stages of the media delivery pipeline. The pipeline health graph in the interface 550 may indicate the flow (or lack thereof) for a media stream represented by a particular content identifier through particular nodes, from the beginning of the pipeline to the end, if possible.

In one embodiment, one or more segments or other elements may be traced back until the problematic stage (or component thereof) is identified. The problematic stage may be the final stage at which a segment or portion was received or the stage immediately downstream from the final stage at which a segment or portion was sent. The tracing data at or beyond the problematic stage may be absent in the database for the relevant segments or elements, or tracing data at or beyond the problematic stage may indicate errors in the processing of the relevant segments or elements. As shown in the example of FIG. 6, the problematic stage may be determined to be the CDN node 660B in the CDN stage 160. The problematic stage (or component within a stage) may be highlighted with any suitable graphical or textual indicator, such as the double dotted line in FIG. 6.

Figure 7:
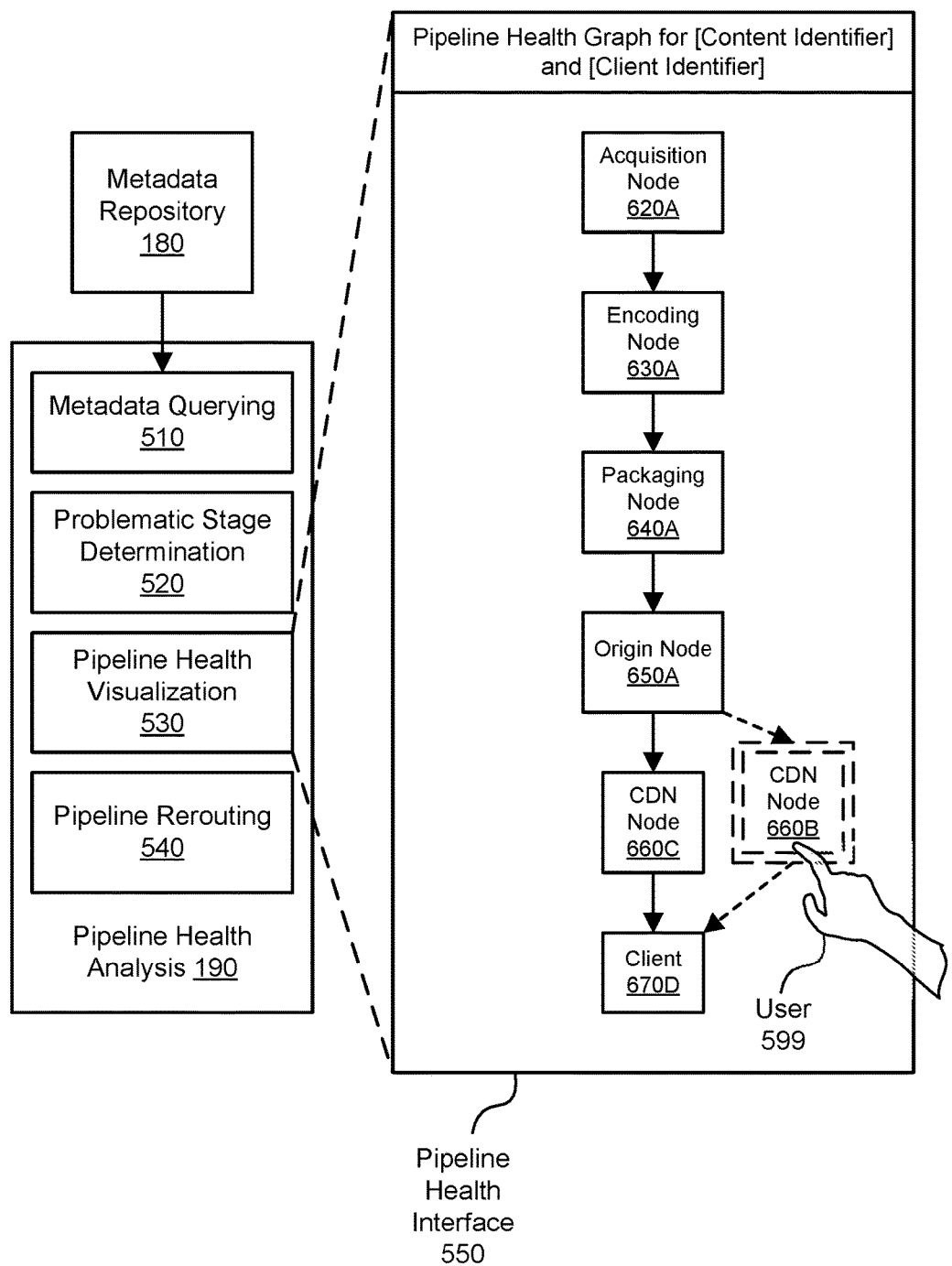
FIG. 7 illustrates the rerouting of a pipeline to bypass a problematic stage, according to one embodiment.

FIG. 7 illustrates the rerouting of a pipeline to bypass a problematic stage, according to one embodiment. Based on the pipeline health monitoring, additional steps may be taken, e.g., by administrators of the media streaming system 100. For example, in a system with redundant components or paths, an administrator may bypass a component of a problematic stage by rerouting one or more streams to an alternative and properly functioning version of that component. As shown in the example of FIG. 7, using the pipeline rerouting functionality 540, a user 599 may reroute the flow of a particular content identifier through CDN node 660C instead of problematic node 660B to the client device 670D. In one embodiment, the rerouting may be initiated by appropriate user input in the interface 550, e.g., by moving the CDN node 660B and replacing it with the CDN node 660C. In some embodiments, the rerouting may be triggered and performed automatically or suggested to the user 599 and then performed with user approval. In one embodiment, rerouting in this manner may involving sending a new manifest to the client device 670D that, on receipt, causes the player software on the client to request segments from the CDN server represented by the node 660C rather than the malfunctioning CDN server represented by the node 660B. Rerouting through other stages such as the acquisition stage 120, encoding stage 130, or packaging stage 140 may involve different techniques for reconfiguring the connections between components.

Figure 8:
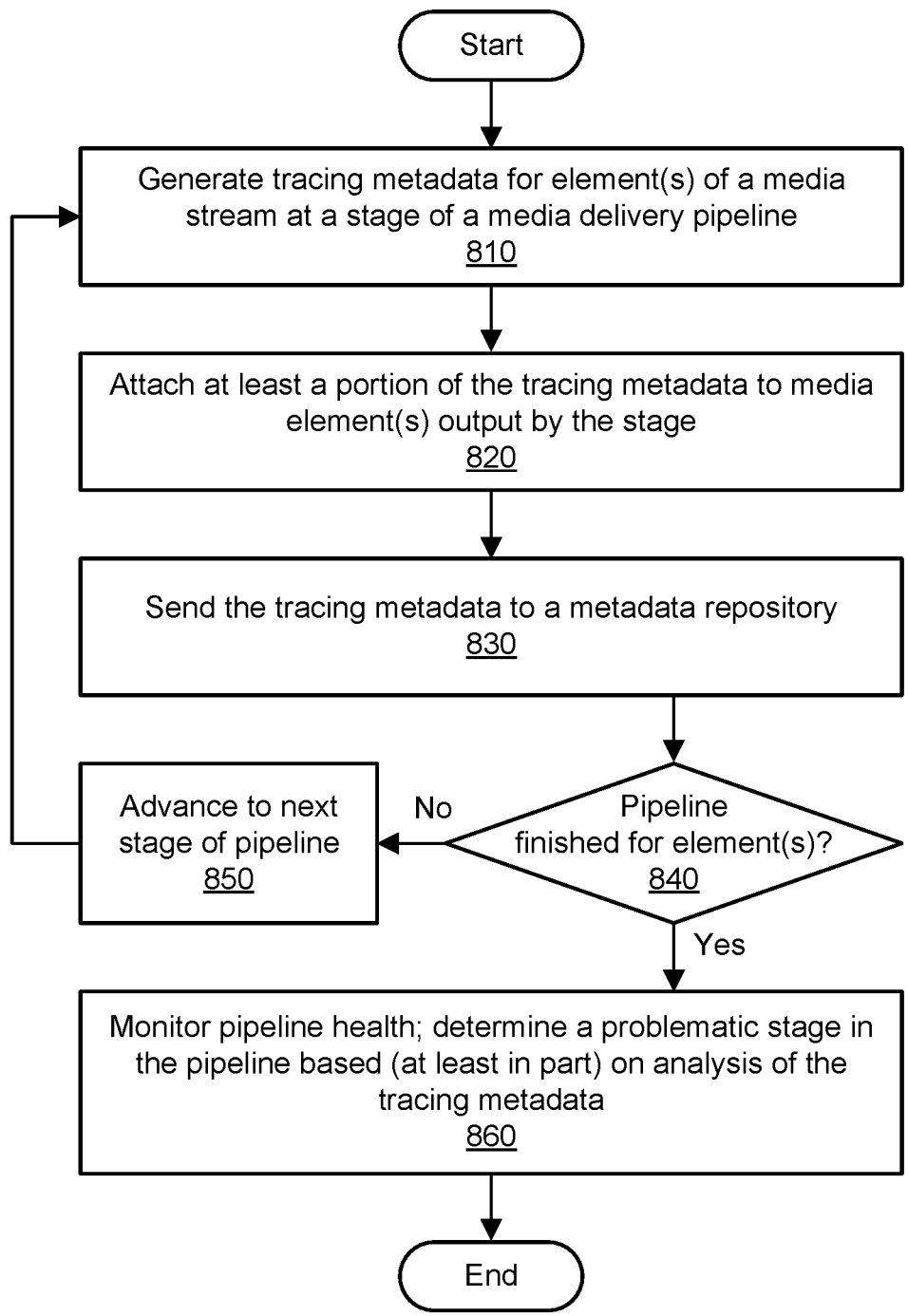
FIG. 8 is a flowchart illustrating a method for monitoring of media pipeline health using tracing, according to one embodiment.

FIG. 8 is a flowchart illustrating a method for monitoring of media pipeline health using tracing, according to one embodiment. The operations shown in FIG. 8 may be performed, at least in part, by a media streaming system. The media streaming system may implement a media delivery pipeline to stream media, such as video or audio, to client computing devices for playback on those devices. The media may represent live or prerecorded media content, typically associated with a particular channel or a media asset from a library of streamable media. The pipeline may include multiple stages; the stages may represent various transformations of the media and/or various distribution paths for the media (e.g., from device to device over the internet). Multiple computing devices may typically be used to implement the multi-stage pipeline. In some circumstances, more than one stage may be performed by the same computing device.

In one embodiment, the stages may include an acquisition stage, an encoding stage, and a packaging stage. At the acquisition stage, a signal representing the media may be acquired from a content provider, e.g., a broadcaster. The signal may be acquired by the media streaming system using any of several suitable transport mechanisms, including a camera feed, a microphone feed, an internet protocol (IP) connection, an asynchronous serial interface (ASI) connection, and so on. At the encoding stage, the media may be transformed into a particular video or audio format, e.g., using a particular codec. The encoding stage may include compression, or a separate compression stage may be used in the pipeline. Additionally, at the encoding stage, the media may be divided into segments or chunks of a fixed or variable size. For example, the media may be divided into segments of approximately ten seconds in length for delivery via HTTP over TCP/IP. At the packaging stage, the media may be packaged and multiplexed (or "muxed") for playback on particular playback software (referred to herein as a "player") and/or a particular type of client device (e.g., a particular category of smartphone). In one embodiment, additional stages of the pipeline may perform additional transformations of the media, such as encryption performed at an encryption stage, decoding performed at a decoding stage, framerate conversion performed at a framerate conversion stage, scaling performed at a scaling stage, and/or other types of image processing (e.g., color transformation) performed at an image processing stage. Alternatively, the additional transformations may be performed as a sub-stage of another stage such as the encoding stage.

In one embodiment, the stages may include an origin server stage (also referred to as an origin stage) and a content delivery network (CDN) stage. The pipeline may include one or more origin servers and a larger number of CDN servers. The origin server(s) may act as distribution points to the CDN servers. The CDN servers may be located closer to clients in terms of geography and/or network latency in order to provide efficient distribution of the media. A single origin server may provide a media stream to many CDN servers, and each CDN server may then respond to requests for media from many client devices. In some cases, such as for prerecorded media, the origin server may persistently store the media (or segments thereof) for an indefinite period of time, while the CDN servers may cache segments of the media for a more limited period of time. If a client requests particular content that is not available in the cache at a CDN server, then the CDN server may request the content from the origin server and then deliver the content to the requesting client. At the origin server stage, the media may be sent from the origin server to one or more CDN servers. If other stages such as the acquisition stage, encoding stage, and/or packaging stage are performed at the origin server, then the origin stage may include those stages or include corresponding sub-stages. However, it is also contemplated that the origin server stage may represent a distinct stage relative to the acquisition stage, encoding stage, and/or packaging stage. At the CDN stage, the media may be sent from a CDN server to a client device, e.g., as requested by the client device. In one embodiment, the stages may also include a playback stage that represents attempted playback by a player on a client device.

As shown in 810, tracing metadata may be generated for one or more elements (e.g., segments) of a media stream at a particular stage of a media delivery pipeline. The tracing metadata may include a content identifier for the media stream. The content identifier may be globally unique within the context of the media streaming system. For example, if the media represents a live video stream, then the content identifier may indicate a particular channel. As another example, if the media represents prerecorded media content, then the content identifier may indicate a particular media asset from a library of streamable media. In one embodiment, the content identifier may be generated once (e.g., at the acquisition stage) and then propagated from stage to stage. The tracing metadata may include a segment identifier for each element or segment. For example, the segment identifiers may be ordered to reflect a sequence of the segments or other elements of the streaming media. In one embodiment, the segment identifier may be generated once (e.g., at the encoding stage or any stage at which the stream is broken into segments) and then propagated from stage to stage. The tracing metadata may include a stage identifier for the particular stage. The stage identifier may indicate the type of stage (e.g., acquisition, encoder, packager, origin, CDN, playback), potentially the sub-stage of the stage, and potentially the particular instance, component, or device within the stage that generates the metadata. The tracing metadata may include a timestamp. In one embodiment, the tracing metadata for a particular stage may be generated both when an element of media is received and also when an element of media is transferred to the next stage of the pipeline. In such an embodiment, the timestamps may differ for the first or "input" set of tracing metadata and the second or "output" set of tracing metadata at a particular stage. The tracing metadata may also include stage-specific elements, e.g., indicating errors that occur in any attempted operations at the stage. In various embodiments, tracing metadata may not be generated at every stage of the pipeline. However, analysis of the health of the pipeline will typically improve when tracing data is generated by a greater number of stages. The tracing metadata may be generated more than once within a stage, e.g., on input and output and/or at multiple sub-stages.

As shown in 820, the tracing metadata (or at least a portion thereof) may be attached to the one or more elements of media before the elements are sent to the next stage of the pipeline. A segment or other element of media may said to be tagged with the tracing metadata for that segment. The content identifier and segment identifier may typically be generated once and then propagated from stage to stage, while the stage identifier may be omitted from the segment sent to the next stage or sent but then discarded at the next stage. As shown in 830, the tracing metadata may also be sent to a metadata repository or other centralized component. The metadata repository may be maintained by the media streaming system using locally accessible storage resources or external storage resources such as a database service or system. The tracing metadata may be sent to the metadata repository substantially in real time, or at least without a significant delay. In one embodiment, the tracing data may be packaged and then sent when a sufficient amount (potentially for multiple different media streams) has accumulated at the stage. Typically, most stages that send tracing data to the metadata repository may do so without being prompted by the metadata repository or other centralized component of the media streaming system. In some embodiments, not every stage may send tracing metadata without being prompted by a centralized component. For example, the CDN servers may not generate or send tracing data automatically, but they may generate and periodically send logs (potentially on request) that may contain tracing metadata or that can otherwise be used to infer the health of media streams at the CDN stage.

As shown in 840, it may be determined whether the pipeline is finished for the one or more elements of media. The pipeline may be considered finished when the element(s) are successfully played back on the client device or when an error occurs at a particular stage that stops the pipeline for a particular element or media stream. As shown in 850, the method may advance to the next stage of the pipeline if the pipeline is not finished for the element(s). The stages in the pipeline may be ordered, and each stage may be configured to pass the tagged element(s) to one or more components of the next stage.

As shown in 860, the health of the pipeline may be monitored using the tracing metadata. In one embodiment, a problematic stage (e.g., a component within the stage that is responsible for problematic delivery or problematic playback) may be determined based (at least in part) on analysis of the tracing metadata. The analysis may be performed either reactively or proactively. The reactive analysis may typically be performed after a report of problematic delivery is received, e.g., from a client (e.g., an end user operating a client computing device on which playback was attempted) or from another organization involved in the pipeline such as a broadcaster who generated the media content, a publisher of player software on the client device, a publisher of operating system software on the client device, a distributor of the client device, and so on. Problematic delivery may include playback that never begins, playback that begins but then stops prematurely, playback with sound but not video, playback with video but not sound, playback with low-quality or distorted video, playback with low-quality or distorted sound, playback with improperly synchronized sound and video, slow or choppy playback, and/or any other form of attempted playback that does not meet client expectations. The pipeline health analysis may be offered as a service to multiple clients.

To perform reactive analysis, relevant tracing metadata may be retrieved from the metadata repository or other centralized component. The relevant metadata may be associated with a particular content identifier as referenced in the report, e.g., indicating a particular channel or media asset from a library. The relevant metadata may also be associated with the particular client, e.g., with a connection between a CDN server and the particular client. The particular client may be identified in the metadata repository based on an IP address of the client device, an account identifier for the client with the media streaming service, a serial number or other unique identifier of the instance of player software on the client device, and/or any other suitable identifier of the client device itself. In one embodiment, a graph or visualization of the flow of the media stream may be presented in a graphical user interface, and a user may click on a node to trace a particular element or stream forwards or backwards. For example, the user may click on a node representing the particular client device of a client associated with a report of problematic playback. The relevant metadata may be analyzed to trace one or more elements of the media stream from the client device back to one or more upstream stages of the media delivery pipeline. In one embodiment, the elements may be traced back until the problematic stage is identified. The problematic stage may be the final stage at which an element of media was received or the stage immediately downstream from the final stage at which an element of media was sent. The tracing data at or beyond the problematic stage may be absent in the database for the relevant elements of media, or tracing data at or beyond the problematic stage may indicate errors in the processing of the relevant elements of media.

To perform proactive analysis, the tracing metadata may periodically be retrieved from the database and analyzed to monitor the health of the pipeline. Using the tracing metadata, a graph or other visualization of a flow of the media stream may be generated. The visualization may be based on metadata for one content stream or set of segments or for many different content streams. The visualization may show a tree-like structure in which the various stages (e.g., components) are nodes and the connections between the stages are edges. For example, the graph may show that one origin server provides media to several downstream CDN servers, and each CDN server has connections with many clients. In the visualization, many clients may be represented by a single component, potentially with an indicator of the number of clients. The graph or visualization may include one or more visual indicators of the health of various portions of the pipeline, potentially including visual indicators of problematic delivery of the media stream in one or more portions of the media delivery pipeline. For example, a green node or edge may represent proper functioning of a stage or transition between stages, a yellow node or edge may represent slow delivery (e.g., as indicated by analysis of timestamps for segments), and a red node or edge may indicate a total failure of functionality of the stage or transition between stages. Other visual indicators may also be used, such as different types of icons to indicate the varying health of stages and/or different types of lines to indicate the varying health of transitions between stages. In one embodiment, a user of the visualization may click on a node to trace forwards or backwards for one or more segments or streams. In one embodiment, a user of the visualization may click on a node to drill down into additional health analysis for a stage of the pipeline.

In this manner, the health and integrity of the media delivery pipeline may be monitored. Based on the monitoring, additional steps may be taken, e.g., by administrators of the media streaming system. For example, in a system with redundant components or paths, an administrator may bypass a problematic stage such as a packager or CDN server by rerouting one or more streams to an alternative and properly functioning version of that packager or CDN server. Based on the monitoring, additional steps may be automatically triggered and performed, e.g., to send alerts or switch to backup components.

Illustrative Computer System

In at least some embodiments, a computer system that implements a portion or all of one or more of the technologies described herein may include a computer system that includes or is configured to access one or more computer-readable media. FIG. 9 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a media streaming system, wherein the media streaming system is configured to:
generate, at a plurality of stages of a media delivery pipeline, tracing metadata for elements of a video stream, wherein the tracing metadata comprises a content identifier of the video stream, a segment identifier of the elements, and a stage identifier of the stages, wherein at least a portion of the tracing metadata is propagated from stage to stage of the media delivery pipeline;
send the tracing metadata from the plurality of stages to a metadata repository, wherein the tracing metadata is generated using components that implement the plurality of stages; and
invoke a pipeline health analysis service to identify, for the video stream, a problematic stage within the plurality of stages based at least in part on analysis of the tracing metadata retrieved from the metadata repository that traces a segment or an element of the video stream forward or backward within the plurality of stages of the media delivery pipeline according to the propagated portion of the tracing metadata, wherein the pipeline health analysis service is offered to a plurality of clients.

2. The system as recited in claim 1, wherein the stages comprise an acquisition stage, an encoding stage, and a packaging stage.

3. The system as recited in claim 1, wherein the media streaming system is further configured to:
receive a report of problematic delivery of the video stream from a client of the media streaming system;
wherein, in identifying the problematic stage, the media streaming system is further configured to:
retrieve, from the metadata repository, tracing metadata associated with the content identifier and associated with a connection with the client; and
trace one or more of the elements of the video stream from the client to one or more upstream stages of the media delivery pipeline until the problematic stage is identified.

4. The system as recited in claim 1, wherein the media streaming system is further configured to:
display a graph of a flow of the video stream in the media delivery pipeline using the pipeline health analysis service, wherein the graph is generated based at least in part on the tracing metadata, and wherein the graph comprises one or more visual indicators of problematic delivery of the video stream in one or more portions of the media delivery pipeline.

5. A computer-implemented method, comprising:
performing, by one or more computing devices that implement a media streaming system:
generating, at a plurality of stages of a media delivery pipeline, tracing metadata for elements of a media stream, wherein the tracing metadata comprises a content identifier, a segment identifier, and a stage identifier, wherein at least a portion of the tracing metadata is propagated from stage to stage of the media delivery pipeline;
sending the tracing metadata from the plurality of stages to a metadata repository, wherein the tracing metadata is generated using components that implement the plurality of stages; and identifying a problematic stage within the plurality of stages based at least in part on analysis of the tracing metadata in the metadata repository that traces a segment or an element of the video stream forward or backward within the plurality of stages of the media delivery pipeline according to the propagated portion of the tracing metadata.

6. The method as recited in claim 5, wherein the stages comprise an acquisition stage, an encoding stage, and a packaging stage.

7. The method as recited in claim 5, wherein the stages comprise an origin server stage and a content delivery network stage.

8. The method as recited in claim 5, further comprising:
receiving a report of problematic delivery of the media stream;
wherein identifying the problematic stage further comprises:
retrieving, from a metadata repository, tracing metadata associated with the content identifier and associated with a connection with a client; and
tracing one or more of the elements of the media stream from the client to one or more upstream stages of the media delivery pipeline until the problematic stage is identified.

9. The method as recited in claim 5, further comprising:
generating a visualization of a flow of the media stream in the media delivery pipeline, wherein the visualization is generated based at least in part on the tracing metadata in the metadata repository, and wherein the visualization comprises one or more visual indicators of problematic delivery of the media stream.

10. The method as recited in claim 5, further comprising:
triggering one or more actions based at least in part on identifying the problematic stage.

11. The method as recited in claim 5, wherein the tracing metadata includes a timestamp, and wherein, for at least a portion of the stages, the tracing metadata is generated at the beginning of the stage and at the end of the stage.

12. The method as recited in claim 5, wherein the problematic stage is identified using a pipeline health analysis service offered to a plurality of clients.

13. A non-transitory computer-readable storage medium storing program instructions computer-executable to perform:
generating, at a plurality of stages of a media delivery pipeline, tracing metadata for elements of a video stream, wherein the tracing metadata comprises a content identifier, a segment identifier, a stage identifier, and a timestamp, wherein at least a portion of the tracing metadata is propagated from stage to stage of the media delivery pipeline;
sending the tracing metadata from the stages to a metadata repository, wherein the tracing metadata is generated using components that implement the plurality of stages; and monitoring a health of the plurality of stages based at least in part on analysis of the tracing metadata in the metadata repository that traces a segment or an element of the video stream forward or backward within the plurality of stages of the media delivery pipeline according to the propagated portion of the tracing metadata, wherein the health is monitored using a pipeline health analysis service.

14. The non-transitory computer-readable storage medium as recited in claim 13, wherein the stages comprise an acquisition stage, an encoding stage, and a packaging stage.

15. The non-transitory computer-readable storage medium as recited in claim 13, wherein the stages comprise an origin server stage and a content delivery network stage.

16. The non-transitory computer-readable storage medium as recited in claim 13, wherein the program instructions are further computer-executable to perform:
receiving a report of problematic delivery of the video stream;
retrieving, from the metadata repository, tracing metadata associated with the content identifier and associated with a connection with a client; and
tracing one or more of the elements of the video stream from the client to one or more upstream stages of the media delivery pipeline.

17. The non-transitory computer-readable storage medium as recited in claim 13, wherein the program instructions are further computer-executable to perform:
generating a visualization of a flow of the video stream in the media delivery pipeline, wherein the visualization is generated based at least in part on the tracing metadata, and wherein the visualization comprises one or more visual indicators of problematic delivery of the video stream.

18. The non-transitory computer-readable storage medium as recited in claim 13, wherein the program instructions are further computer-executable to perform:
rerouting the video stream to bypass a problematic stage of the plurality of stages.

19. The non-transitory computer-readable storage medium as recited in claim 13, wherein, for at least a portion of the stages, the tracing metadata is generated at the beginning of the stage and at the end of the stage.

20. The non-transitory computer-readable storage medium as recited in claim 13, wherein the program instructions are further computer-executable to perform:
identifying a problematic stage of the plurality of stages, wherein the problematic stage is identified using the tracing data in the metadata repository and using the pipeline health analysis service.

* * * * *